United States Patent
Johnson

(10) Patent No.: US 9,836,422 B2
(45) Date of Patent: Dec. 5, 2017

(54) SYSTEM AND METHOD FOR DATA CONVERSION

(71) Applicant: BLACK TANK LLC, Amesbury, MA (US)

(72) Inventor: Douglas A. Johnson, Groveland, MA (US)

(73) Assignee: Black Tank LLC, Amesbury, MA (US)

( * ) Notice: Subject to any disclaimer, the term of this patent is extended or adjusted under 35 U.S.C. 154(b) by 161 days.

(21) Appl. No.: 15/004,215

(22) Filed: Jan. 22, 2016

(65) Prior Publication Data

US 2016/0218989 A1 Jul. 28, 2016

Related U.S. Application Data

(60) Provisional application No. 62/106,923, filed on Jan. 23, 2015.

(51) Int. Cl.
*G06F 13/38* (2006.01)

(52) U.S. Cl.
CPC .................. *G06F 13/387* (2013.01)

(58) Field of Classification Search
None
See application file for complete search history.

(56) References Cited

U.S. PATENT DOCUMENTS

| | | | | |
|---|---|---|---|---|
| 5,623,449 | A | * 4/1997 | Fischer | G06F 11/1008 315/200 R |
| 2006/0123161 | A1 | * 6/2006 | L. Wallace | G06F 13/385 710/52 |
| 2006/0193133 | A1 | * 8/2006 | Von Der Brelie | H05B 33/0821 362/276 |
| 2010/0060194 | A1 | * 3/2010 | Furry | H05B 33/0803 315/294 |
| 2011/0109228 | A1 | * 5/2011 | Shimomura | H05B 37/0245 315/113 |

* cited by examiner

*Primary Examiner* — Benjamin Lamont
(74) *Attorney, Agent, or Firm* — Brooks Kushman P.C.

(57) ABSTRACT

A system and method for data conversion includes a transmitter configured to receive high-speed data and convert it into wireless low-speed data for output to a receiver. The transmitter includes a radio device and one or more processors for converting the high-speed data to low-speed data. Once received by the receiver, the low-speed data may be output for use directly by equipment which uses such data, or it may be reconverted to high-speed data and output to equipment that utilizes high-speed data signals.

24 Claims, 3 Drawing Sheets

SYSTEM AND METHOD FOR DATA CONVERSION

CROSS-REFERENCE TO RELATED APPLICATIONS

This application claims the benefit of U.S. provisional application Ser. No. 62/106,923 filed Jan. 23, 2015, the disclosure of which is hereby incorporated in its entirety by reference herein.

TECHNICAL FIELD

The present invention relates to a system and method for data conversion.

BACKGROUND

High-speed data transmission protocols are used in many applications in many industries. For example, the DMX512 standard for data transmission is well known and common in the stage lighting/entertainment lighting industry. DMX512 is typically implemented as a "hard wired" data link using EIA-485 differential signaling. The DMX512 standard specifies a data protocol, which includes an amount of data—up to 512 bytes—and a data rate: 250 k baud. The maximum 512 bytes (e.g., channels) is referred to as a single "universe" of lighting channels. At the 250 k baud data rate, a single universe takes approximately 23 milliseconds (msec) to send. Wirelessly sending and receiving this amount of data at this rate is problematic, and may require specialized radio equipment to do so reliably.

The specialized equipment used to send DMX512 data wirelessly can be prohibitively expensive for some installations, and fails to take advantage of the more readily available and less expensive lower speed radios—for example, ones that transmit and receive data using a "serial" protocol, such as RS232. One limitation of these radios is that they may be unable to transmit data at a high speed, such as required by a protocol such as DMX512 or other high-speed protocols.

SUMMARY

At least some embodiments of the present invention provide a system and method for taking in hard-wired, high-speed data and converting it to a lower-speed protocol so that more generic "off-the-shelf radios" can be used to transmit the data. In at least some embodiments, a high-speed protocol such as DMX512 may be converted to a lower-speed serial protocol such as RS232. Other embodiments may utilize different protocols, such as DALI, 0-10 V analog, Bluetooth and RS485. At least some embodiments of the present invention convert a high-speed data to a lower-speed data for transmission by a radio that is relatively low-power—e.g., battery-powered or one that utilizes power scavenged from another source, such as a communication port or other output channel.

In at least some embodiments, a method of the present invention may include at least some of the following steps. First, one-half of a universe of hard-wired, full-speed DMX512 data or other high speed data—is received. The data is then compressed so that fewer bytes will ultimately need to be sent. The compressed data is then converted to a serial—or other lower-speed protocol—and wirelessly sent via a radio acting as a transmitter. Another radio is used to receive the wireless transmission from the first radio, and the resulting data leaving the radio-receiver may then be used in any of a number of ways. For example, the serial data may be converted back into DMX512 data, and then connected through a wired-connection to equipment that uses that kind of data. Alternatively, the resulting serial data may be used without further conversion to run equipment, such as a light, directly. This provides a lower-power solution—as compared to the conversion back to high speed data—and is also less complex, which may substantially reduce component cost—e.g., by eliminating the need for an additional wall power adapter for the receiver.

At least some embodiments of the present invention include a system and method of compressing and transmitting a high-speed data protocol using lower-speed equipment. In at least some embodiments, one-half of a DMX512 universe (256 channels) is compared to the next reception of that same half-universe, and then, only those characters that changed are transmitted. The characters being received in the half-universe are interleaved between the characters that are changing, so that if any new equipment—e.g., lighting fixtures—are randomly plugged-in, or turned-on at some time after transmission has started, they will still get the "reference" (non-changing) data set of characters.

Some high-speed protocols, such as DMX512, specify a method of starting the data stream—i.e., indicating the beginning of a new frame of data—that cannot simply be retransmitted using traditional universal asynchronous receiver/transmitters (UARTs) found on microprocessors. For example, DMX512 uses a "break" character to do this, which, by definition, is a character that is longer in time—i.e., takes more time to transmit—than normal characters. This means a "break" character cannot be simply generated using a UART, and thus cannot be simply sent serially using "serial cable replacement" radios. To address this issue, at least some embodiments of the present invention convert each DMX512 character received into its own frame, and transmit them in small independent packets. These packets may be comprised of a frame start character, an address character—where the DMX character was inside the original DMX512 data stream—and then a brightness character. Each DMX512 character is thus converted into a packet of three separate characters to be transmitted serially over the radios.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
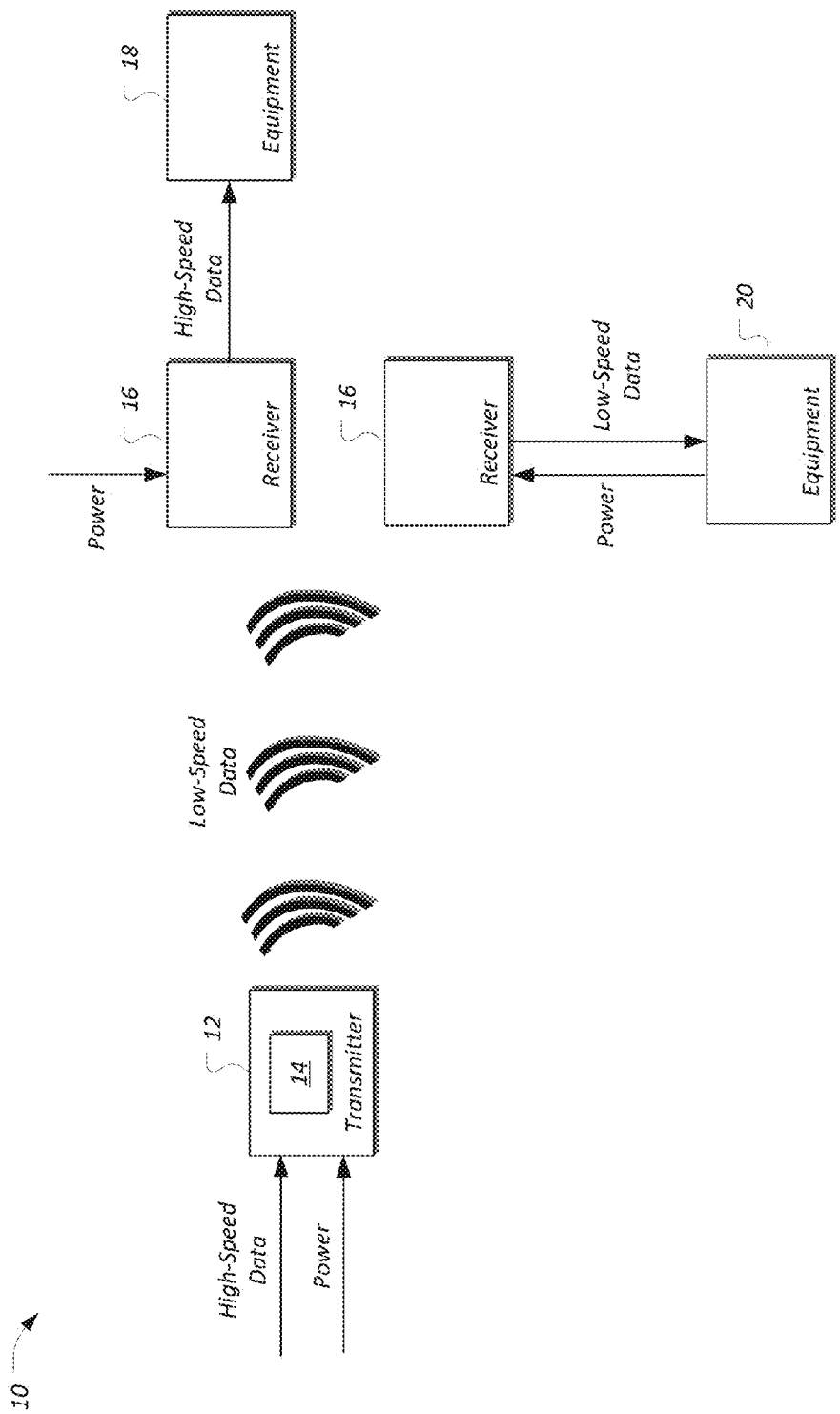
FIG. 1 is a schematic diagram of a system in accordance with embodiments of the present invention.

FIG. 1 shows a schematic representation of a system 10 in accordance with embodiments of the present invention. A transmitter 12 includes a low-speed radio, such as a "serial cable replacement" radio, and also contains one or more processors such as the microcontroller 14 described and illustrated in FIG. 2. As shown in FIG. 1, the transmitter 12 receives high-speed data through a wire connection, and then converts it to low-speed data before sending it wirelessly to a receiver 16. The transmitter 12 may be powered by the wire connection in some examples, or by a separate power source in others. The receiver 16 may also be a serial cable replacement radio, and may also contain one or more processors similar to the microcontroller 14, but which is configured to function in reverse—i.e., receiving wireless low-speed data and converting it to high-speed data for output to equipment 18. The equipment 18 may be, for example, lighting equipment that is controlled by a high-speed data signal such as DMX512, or it may be other types of equipment that utilize such signals. It should be noted that many examples herein relate to DMX512, but the disclosure is applicable to other high-speed data signals with relatively few differences in value per updated frame.

In at least some embodiments, a receiver, such as the receiver 16, does not reconvert the low-speed data to high-speed data, but rather, uses it in the low-speed form. In such a case, the low-speed data may be sent directly, for example through a wired connection, to equipment 20, which is of the type that is controlled using a low-speed protocol signal rather than the high-speed signal used by equipment 18. For instance, the user may set the receiver 16 to a channel number (or set of channel numbers) to be received, and may connect the receiver 16 to the equipment 20 to be controlled based on the data received on those channels. The receiver 16 may also be powered by a wire connection to the equipment 18 in some examples. For instance, the receiver 16 may be a plug-in dongle attachment (e.g., for wireless retrofits), and may scavenge power from the connector on the equipment 20 to run the receiver 16 so as to avoid requiring the receiver 16 to be powered by a separate wall or other power adapter.

Figure 2:
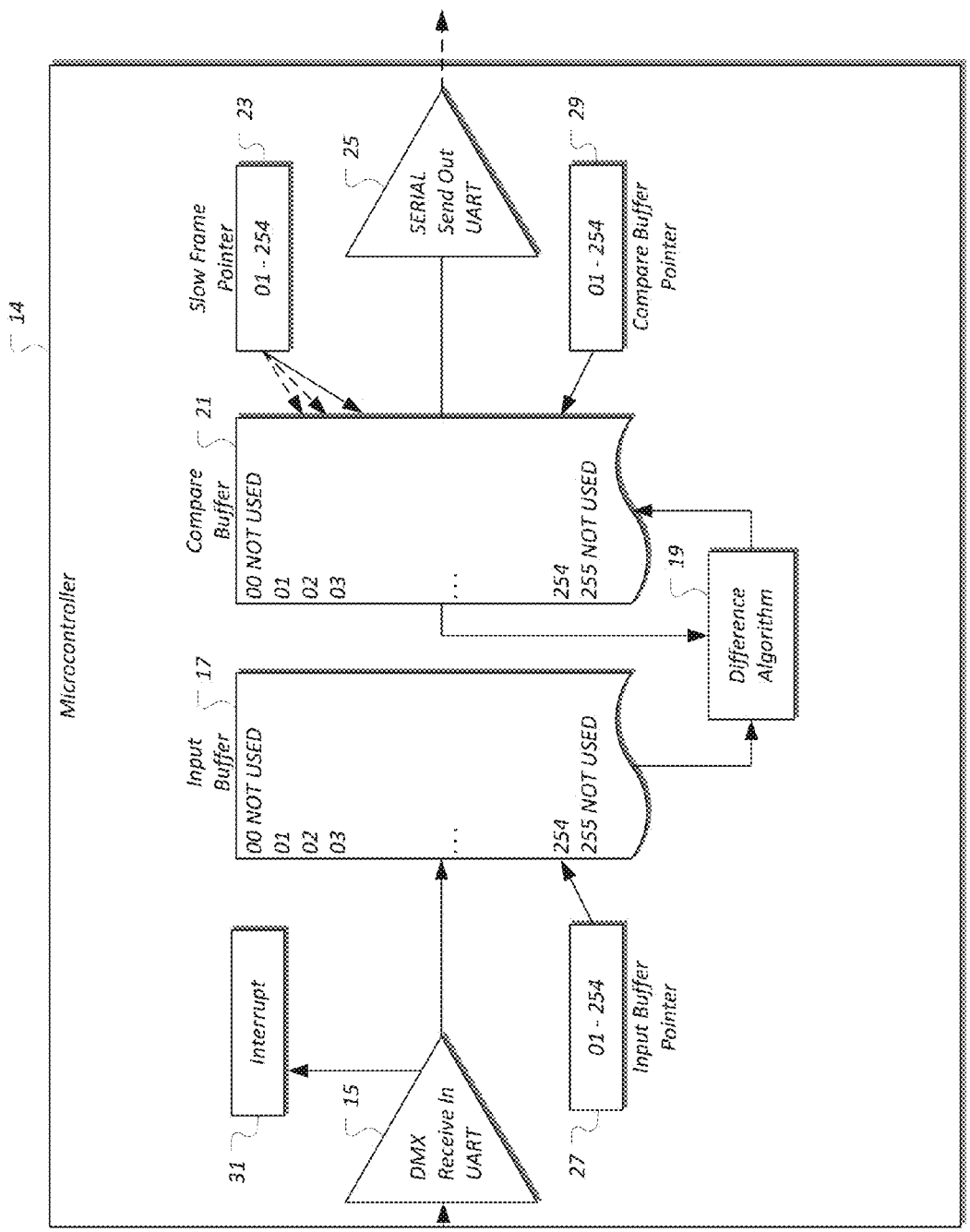
FIG. 2 is a detailed illustration of a portion of the system shown in FIG. 1.

FIG. 2 shows the microcontroller 14 in detail. Specifically, high-speed data, such as DMX data, is received at DMX receive in block 15 and is then sent to an input buffer 17. A compare buffer 21 stores data values that were previously sent out using a serial send out block 25. A difference algorithm 19 uses an input buffer pointer 27 and a compare buffer pointer 29 to iterate through the input buffer 17 and the compare buffer 21. The iteration compares data values of the input buffer 17 to those of the compare buffer 21, and identifies updated values to be sent out. A slow frame pointer 23 is used with the compare buffer 21 to provide for a slow reference iteration cycle of the compare buffer 21 interleaved between the difference iterations. Ultimately, a low-speed signal, such as a serial signal, is output at the serial send out block 25.

The input buffer 17 may be a memory or set of memory locations in which the 254 DMX channels of data (e.g., one half of a DMX universe) are stored. When data is received, an interrupt 31 is raised by the DMX receive in block 15. Responsive to the raising of the interrupt 31, the microcontroller 14 stores the DMX values to the input buffer 17. This data is typically sent by DMX sources at 250 Kbaud, which is not a common serial communication rate.

The compare buffer 21 may be a memory or set of memory locations in which the values of the last DMX channels that were sent out serially by the microcontroller 14 are held.

The input buffer pointer 27 is a pointer to a location within the input buffer 17 at which the data of one of the DMX channels is stored. The compare buffer pointer 29 is a pointer to a location within the compare buffer 21 at which the data of one of the DMX channels is stored.

The difference algorithm 19 compares each location of the input buffer 17 to each corresponding location of the compare buffer 21. For example, the difference algorithm 19 may use the compare buffer pointer 29 and input buffer pointer 27 to retrieve and compare channel locations values of the compare buffer 21 to respective locations of the input buffer 17. Based on the comparison, the difference algorithm 19 identifies whether the channel value has changed since it was last sent out. If the corresponding locations include the same value, the difference algorithm 19 moves on to compare the next set of corresponding locations. If the values are different, the new value (which is in the input buffer 17) is sent out serially (e.g., with some additional information added, discussed below). The difference algorithm 19 also copies the new value into the corresponding location of the compare buffer 21 to update the compare buffer 21 to include the new value that was last sent out.

When the difference algorithm 19 has finished comparing all the data entries of the input buffer 17 to each corresponding location of the compare buffer 21, the difference algorithm 19 sends on a next reference value of the compare buffer 21. The difference algorithm 19 uses the slow frame pointer 23 to access into the compare buffer 21, and sends the reference value at that specific location out serially. Notably, the reference value is sent out regardless of whether the reference value has been sent out previously. The slow frame pointer 23 is also incremented. When the slow frame pointer 23 sends out the last location of the compare buffer 21, the slow frame pointer 23 is reset to start over at the top of the compare buffer 21. After sending out the reference value, the difference algorithm 19 begins another comparison iteration of the input buffer 17 to the compare buffer 21.

Each time channel information is sent (e.g., for the input buffer 17 comparison and for the reference value update), the serial send out 25 adds two additional characters of information, for a total of three characters for every channel sent. The first character sent is a "sync marker" configured to signify the beginning of a serial data element being sent. In an example, the sync marker value may be 255. The second character sent is the location on the compare buffer 21 from which the original character came from (01-254). The third character is the original DMX channel value being sent, except that if this value is 255 (max on), that specific value is sent out as 254 instead. (By sending out the value 255 as 254, the microcontroller 14 can preserve the value 255 as unambiguously being the sync marker. The value 254 may be relatively indistinguishable by a user from the value 255. Moreover, the receiver 16 may optionally elect to interpret the value 254 as 255.) The serial send out 25 data may be sent out at 9600 baud, or another common serial communication rate.

Figure 3:
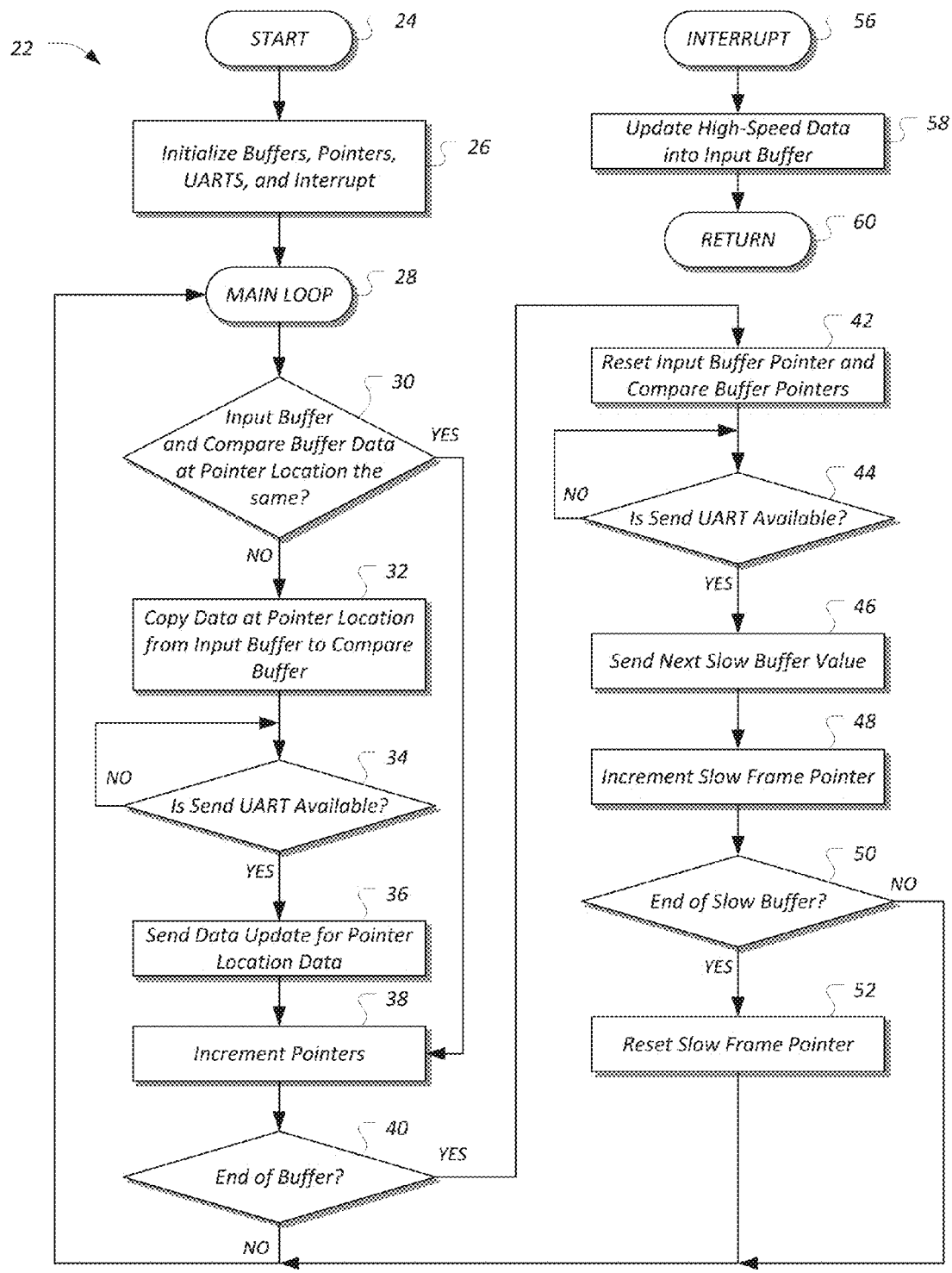
FIG. 3 is a flowchart of a method in accordance with embodiments of the present invention.

FIG. 3 shows a flowchart 22 illustrating a method in accordance with embodiments of the present invention. In an example, the method may be performed by the microcontroller 14 discussed in detail above. The flowchart 22 illustrates three distinct sections: a power-up or initialization section as illustrated by blocks 24-26; a main-loop section as illustrated by blocks 28-52; and an interrupt-loop section illustrated by blocks 56-60. After power-up and initialization of various buffers and other hardware as indicated at step 26, the main loop executes through a series of decision blocks and execution blocks before looping back to the initial decision block 30. Generally, the main loop interleaves reference values of the high-speed data being sent with values of the high-speed data that are changing. When a new high-speed character, such as a DMX character, arrives, the interrupt loop performs the steps indicated at block 58 before returning to the main loop as indicated at step 60.

More specifically, the method beings at operation 24 responsive to power up of the microcontroller 14. Power up may occur, in an example, responsive to plugging the transmitter 12 into a high-speed data line. At 26, the microcontroller 14 is initialized to perform the conversion of high-speed data (e.g., DMX) to serial data. In an example, the microcontroller 14 initializes the entries of the input buffer 17 and compare buffer 21 to known values (e.g., zero), initializes the input buffer pointer 27 to the top of the input buffer 17, and initializes the compare buffer pointer 29 to the top of the compare buffer 21. The microcontroller 14 may also initialize the slow frame pointer 23 to the top of the compare buffer 21. The microcontroller 14 may also initialize the receive UART 15 to receive DMX characters in at 250 KBaud, and initialize the send UART 25 to transmit serial characters out at a common serial rate, such as 9600 Baud. The microcontroller 14 may also initialize the interrupt 31 to occur on reception of DMX characters to the receive UART 15, such that when such characters are received at the UART 15, control passes to the interrupt-loop section illustrated by blocks 56-60. After operation 26, control passes to the main-loop section at operation 28.

In the main-loop section 28, at 30 the microcontroller 14 determines whether the data pointed to in the input buffer 17 by the input buffer pointer 27 is the same as the data pointed to in the compare buffer 21 by the compare buffer pointer 29. If so, control passes to operation 32. Otherwise, control passes to operation 38.

At 32, the microcontroller 14 copies the data at the input buffer pointer 27 location of the input buffer 17 to the compare buffer pointer 29 location of the compare buffer 21. Accordingly, the microcontroller 14 updates the compare buffer 21 to include the new channel value. At 34, the microcontroller 14 determines whether the serial send out UART 25 is available for sending data. If not, the microcontroller 14 waits for availability of the send UART 25. Once the send UART 25 is available, control proceeds to operation 36.

At operation 36, the microcontroller 14 sends the updated DMX channel data pointed to by the compare buffer pointer 29 location of the compare buffer 21 to the send UART 25 for transmission. In an example, the microcontroller 14 forms a data packet including the sync character, an indication of the compare buffer pointer 29 location in the compare buffer 21, and the updated value itself. In some cases, if the updated value is the same as the sync character, the updated value may be adjusted to a different value before being sent (e.g., if the sync character and the updated value are 255, the updated value may be transmitted as 254). Thus, the value for the changed DMX channel is transmitted to provide the updated value to any listening receivers 16.

At operation 38, the microcontroller 14 increments the input buffer pointer 27 and the compare buffer pointer 29. At 40, the microcontroller 14 determines whether the input buffer pointer 27 and the compare buffer pointer 29 have reached the ends of the input buffer 17 and compare buffer 21. If not, control returns to operation 28 to continue iterating through the input buffer 17 and compare buffer 21. If the buffers have reached the ends, control passes to operation 42 to reset the input buffer pointer 27 to the first location of the input buffer 17 and to reset the compare buffer pointer 29 to the first location of the compare buffer 21. After operation 42, control passes to operation 44 to continue with the interleaved sending of reference data of the compare buffer 21 data.

At 44, the microcontroller 14 determines whether the serial send out UART 25 is available for sending data. If not, the microcontroller 14 waits for availability of the send UART 25. Once the send UART 25 is available, control proceeds to operation 46.

At 46, the microcontroller 14 sends the channel data pointed to by the slow frame pointer 23 location of the compare buffer 21 to the send UART 25 for transmission. In an example, the microcontroller 14 forms a data packet including the sync character, an indication of the slow frame pointer 23 location in the compare buffer 21, and the value of the compare buffer 21 at the slow frame pointer 23 location. In some cases, if the value is the same as the sync character, the value may be adjusted to a different value before being sent (e.g., if the sync character and the value are 255, the value may be transmitted as 254). Thus, a reference value for the unchanged channel is transmitted to provide the value to any listening receivers 16 who may not have previously received the value.

At operation 48, the microcontroller 14 increments the slow frame pointer 23. At 50, the microcontroller 14 determines whether the slow frame pointer 23 has reached the end of the compare buffer 21. If not, control return to operation 28 of the main loop. If so, control passes to operation 52 to reset the slow frame pointer 23 to the first entry of the compare buffer 21. After operation 52, control return to operation 28 of the main loop.

On reception of DMX characters to the receive UART 15, the microcontroller 14 may sense the raising of the interrupt 31, and may transition control from the operations of the main loop to operation 56. Continuing from operation 56, at operation 58 the microcontroller 14 updates the input buffer 17 to include the value of the DMX character that was received at the correct channel location of the input buffer 17. After operation 58, control passes to operation 60 to return the microcontroller 14 flow to the previously-interrupted operations of the main loop.

A receiver 16 connected to equipment 20 may be set to receive data for a channel number, and may listen to receive data transmissions from the serial send out UART 25. For instance, the receiver 16 may be a plug-in dongle attachment (e.g., for wireless retrofits), and may scavenge power from the connector on the equipment 20 to run the receiver 16 so as to avoid requiring the receiver 16 to be powered by a separate wall or other power adapter. The receiver 16 may listen for data packets from the UART 25 by listening for the sync character. When the sync character is received, the receiver 16 further determines whether the next character of the packet is an indication of a channel number which the receiver 16 is configured to receive. If so, the receiver 16 further reads the value of the next character of the packet, and assigns the output of the receiver 16 to the value. This packet may have been based on detection of a difference between the channel entry of the input buffer 17 and compare buffer 21, or based on the microcontroller 14 providing a reference value of the channel using the slow frame pointer 23. Regardless, the equipment 20 receives the value sent serially and wirelessly from the microcontroller 14.

Computing devices described herein such as the microcontroller 14 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a first universal asynchronous receiver/transmitter (UART) configured to receive high-speed data;
a second UART configured to broadcast serial data;
an input buffer storing data received from the first UART;
a compare buffer storing data for sending by the second UART; and
a controller programmed to
repeatedly iterate through the input buffer and the compare buffer such that when an input location value of the input buffer differs from a corresponding compare location value of the compare buffer, set the corresponding compare location value of the compare buffer to the input location value and send the compare location value, as updated, to the second UART to be broadcast, and
between iterations of the input and compare buffers, send a next value of a reference iteration of the compare buffer to the second UART to be broadcast, regardless of whether the next value was previously broadcast.

2. The system of claim 1, wherein the controller is connected to a DMX512 input, the first UART receives the high-speed data from the DMX512.

3. The system of claim 1, wherein the controller is further programmed to reset the reference iteration to a beginning of the compare buffer when a last entry of the compare buffer is broadcast in the reference iteration.

4. The system of claim 1, wherein the second UART is configured to broadcast the serial data at 9600 baud.

5. The system of claim 1, wherein the controller is further programmed to:
initialize an interrupt triggered when high-speed data is received by the first UART; and
when the interrupt is triggered, update the input buffer with the received high-speed data.

6. The system of claim 1, wherein the controller is further programmed to:
initialize a slow frame pointer to a first entry of the compare buffer; and
between the iterations through the input buffer and the compare buffer, retrieve the next value of the compare buffer using the slow frame pointer, increment the slow frame pointer, and reinitialize the slow frame pointer to a first entry of the compare buffer when the slow frame pointer passes an end of the compare buffer.

7. The system of claim 1, wherein the high-speed data includes a half universe of DMX512, the input buffer includes an entry for each channel of the half universe, and the compare buffer includes a corresponding entry for each channel of the half universe.

8. The system of claim 1, wherein the data sent by the second UART includes a sync character, a location of the compare location value in the compare buffer, and the compare location value.

9. The system of claim 8, wherein the sync character is set to a predetermined value of 255, and wherein the controller is further programmed to send the compare location value as 254 when the compare location value equals the sync character.

10. The system of claim 8, further comprising:
a receiver configured to
identify the sync character in the data sent by the second UART;
determine whether the location of the compare location value is a channel number which the receiver is configured to receive; and
if so, assign an output of the receiver to the compare location value of the data.

11. The system of claim 10, wherein the output of the receiver is connected to an input of an element of equipment, and the receiver scavenges operating power from the input.

12. A method comprising:
repeatedly iterating through an input buffer holding DMX512 channel data and a compare buffer storing data sent over serial broadcast to identify input location values of the input buffer differing from corresponding compare location values of the compare buffer;
for each difference, updating the corresponding compare location value to the input location value and serially broadcasting the compare location value as updated; and
between iterations through the input buffer and the compare buffer, perform a next operation of a reference iteration by serially broadcasting a next value of the compare buffer, regardless of whether the next value is previously broadcast.

13. The method of claim 12, further comprising:
initializing a receiving asynchronous receiver/transmitter (UART) to receive the DMX512 channel data;
receiving an indication of an interrupt triggered when the DMX512 channel data is received; and
in response to the interrupt, storing the received DMX512 channel data to the input buffer.

14. The method of claim 12, further comprising:
initializing a sending asynchronous receiver/transmitter (UART) to broadcast serial data at 9600 baud; and
broadcasting the compare location value using the sending UART.

15. The method of claim 12, further comprising
receiving the DMX512 channel data from a DMX512 input; and
scavenging operating power from the DMX512 input.

16. The method of claim 12, further comprising broadcasting the compare location value in a data format consisting of a sync character, followed by a location of the compare location value in the compare buffer, followed by the compare location value.

17. The method of claim 16, wherein the sync character is set to a predetermined value, and further comprising, when the compare location value equals the predetermined value, broadcasting the compare location value as a value offset from the predetermined value.

18. The method of claim 16, further comprising:
identifying, by a receiver, the broadcasting of the sync character;
determining, responsive to the identifying, whether the location of the compare location value is a channel number which the receiver is configured to receive; and
if so, assigning an output of the receiver to the compare location value of the data.

19. The method of claim 18, further comprising:
providing the output of the receiver to an input of an element of equipment; and
scavenging operating power by the receiver from the input.

20. A non-transitory computer-readable medium embodying instructions that, when executed by a controller in communication with a memory, a first universal asynchronous receiver/transmitter (UART) configured to receive high-speed data, and a second UART configured to broadcast serial data, cause the controller to perform operations comprising to:
repeatedly iterate through an input buffer stored to the memory holding DMX512 channel data received from the first UART and a compare buffer stored to the memory storing data sent over serial broadcast to identify input location values of the input buffer differing from corresponding compare location values of the compare buffer;
for each difference, update the corresponding compare location value to the input location value and serially broadcast the compare location value as updated; and
between iterations through the input buffer and the compare buffer, broadcast a next value of the compare buffer using the second UART in accordance with a reference iteration of the compare buffer, regardless of whether the next value is previously broadcast.

21. The medium of claim 20, further embodying instructions that, when executed by the controller, cause the controller to perform operations comprising to:
initialize an input buffer pointer to a first entry of the input buffer;
initialize a compare buffer pointer to a first entry of the compare buffer;
comparing the input location values pointed to by an input buffer pointer to compare location values pointed to by a compare buffer pointer;
increment each of the input buffer pointer and the compare buffer pointer; and
conclude the iteration when the input buffer pointer and the compare buffer pointer reach ends of the buffers.

22. The medium of claim 20, further embodying instructions that, when executed by the controller, cause the controller to perform operations comprising to:
initialize a slow frame pointer to a first entry of the compare buffer; and
between the iterations through the input buffer and the compare buffer, retrieve the next value of the compare buffer using the slow frame pointer, increment the slow frame pointer;
and reinitialize the slow frame pointer to a first entry of the compare buffer when the slow frame pointer passes an end of the compare buffer.

23. The medium of claim 20, further embodying instructions that, when executed by the controller, cause the controller to perform operations comprising to format the compare location value in a data format consisting of a sync character, followed by a location of the compare location value in the compare buffer, followed by the compare location value.

24. The medium of claim 23, wherein the sync character is 255.

* * * * *